J. G. HESTER.
TOBACCO-HANGERS.
No. 188,631. Patented March 20, 1877.
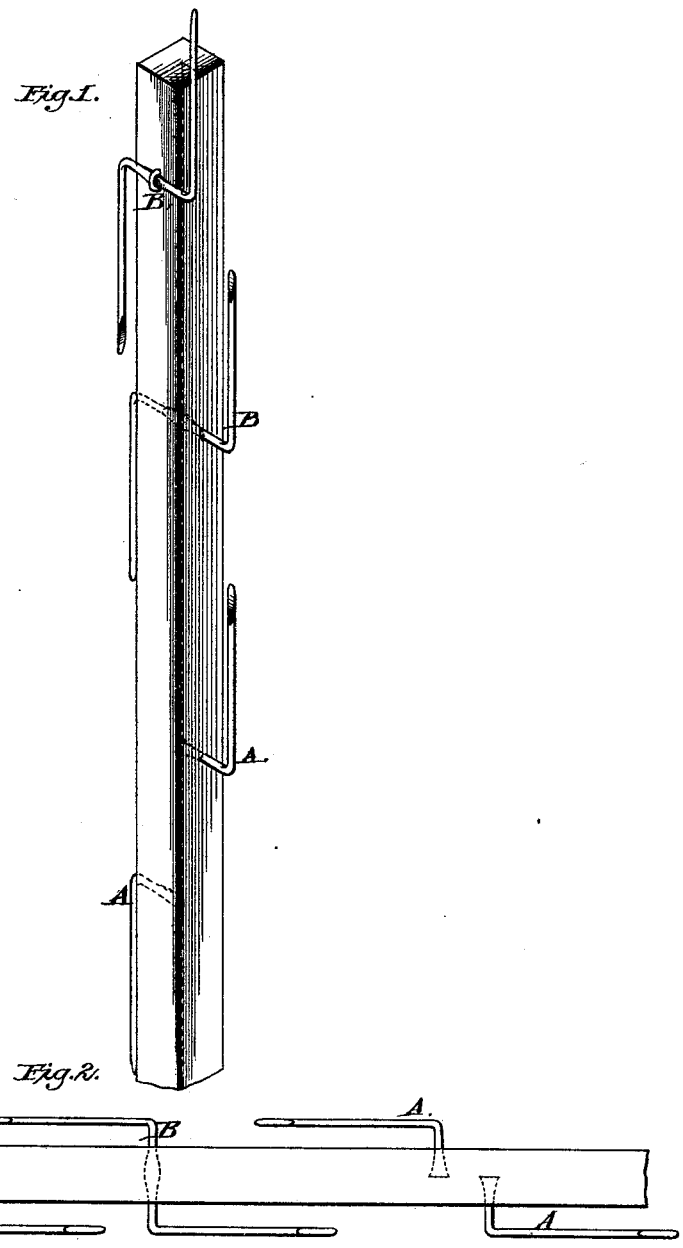
Attest:
Inventor:
Joseph G. Hester

UNITED STATES PATENT OFFICE.

JOSEPH G. HESTER, OF DUTCHVILLE, NORTH CAROLINA.

IMPROVEMENT IN TOBACCO-HANGERS.

Specification forming part of Letters Patent No. 188,631, dated March 20, 1877; application filed September 25, 1876.

*To all whom it may concern:*

Be it known that I, JOSEPH G. HESTER, of Dutchville, in the county of Granville and State of North Carolina, have invented certian new and useful Improvements in Tobacco-Sticks; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to enable the producer of tobacco to save and cure it with greater ease and rapidity, and with less expense and labor, than by any method now used, and also to save those portions of the leaves which are taken from the plant in its early growth, as well as those that ripen and decay on the plant before cutting.

A represents a wire hook, flattened at one end, making it easy to drive in the stick, and prevent it from turning around by the weight of tobacco placed upon it, and should be attached to the stick, as in the drawing. B represents a double hook, sharpened at both ends, and flattened in the center to prevent it from turning around, as represented in the drawing. The sticks may be made of any length, and contain any number of hooks, of such length and size as the growth of the tobacco and the size of the drying-house may require.

By the use of these sticks a greater quantity of tobacco may be placed in the drying-house, and cured in less time, with less fuel and less labor.

Instead of cutting the stalk of tobacco and hanging it in the drying-house with the leaves, by the use of these sticks, the leaves may be taken from the stalk as they ripen. The stick should be held in one hand, the leaves gathered with the other, and attached to the stick by passing the hook through the stem of the tobacco-leaf. The tobacco-stalk, by this process, is left in the field, whereby the injurious effects produced by placing it in the drying-house is obviated, and the tobacco therein will not be darkened or reddened.

I claim—

A single or double angle wire, sharpened at the exposed end or ends, and flattened at the center, or where grasped or held to or within the stick, in combination with said stick, substantially as described.

In testimony that I claim the foregoing as my own I affix my signature in presence of two witnesses.

JOSEPH G. HESTER.

Witnesses:
 H. A. HALL,
 THEO. F. GATCHEL.